US008242892B2

(12) United States Patent
Griffin

(10) Patent No.: US 8,242,892 B2
(45) Date of Patent: Aug. 14, 2012

(54) SYSTEM, METHOD AND PROGRAM PRODUCT FOR COMMUNICATING A PRIVACY POLICY ASSOCIATED WITH A RADIO FREQUENCY IDENTIFICATION TAG AND ASSOCIATED OBJECT

(75) Inventor: Phillip H. Griffin, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 708 days.

(21) Appl. No.: 12/370,365

(22) Filed: Feb. 12, 2009

(65) Prior Publication Data

US 2010/0201489 A1   Aug. 12, 2010

(51) Int. Cl.
*H04Q 5/22* (2006.01)
*G08B 13/14* (2006.01)

(52) U.S. Cl. ............... 340/10.41; 340/572.1; 340/10.1; 340/10.4; 340/10.5; 340/10.52

(58) Field of Classification Search ............... 340/571.1, 340/10.1, 10.4, 10.41, 10.42, 10.5, 10.52
See application file for complete search history.

(56) References Cited

U.S. PATENT DOCUMENTS

| | | | |
|---|---|---|---|
| 5,467,081 A * | 11/1995 | Drews et al. | 340/5.22 |
| 5,649,099 A | 7/1997 | Theimer et al. | |
| 6,044,224 A | 3/2000 | Radia et al. | |
| 6,256,737 B1 | 7/2001 | Bianco et al. | |
| 6,554,188 B1 * | 4/2003 | Johnson et al. | 235/385 |
| 6,836,554 B1 | 12/2004 | Bolle et al. | |
| 7,030,760 B1 | 4/2006 | Brown | |
| 7,120,607 B2 | 10/2006 | Bolle et al. | |
| 7,298,243 B2 | 11/2007 | Juels et al. | |
| 7,302,583 B2 | 11/2007 | Forrest | |

(Continued)

FOREIGN PATENT DOCUMENTS

WO   0065770   11/2000

(Continued)

OTHER PUBLICATIONS

ITU-T Telecommunication Standardization Sector of ITU, X.667, Series X: Data Networks and Open System Communications—OSI networking and system aspects—Naming, Addressing and Registration, ISO/IEC 9834-9838: 2005 (E), 34 pages, Geneva, Switzerland 2005.

(Continued)

*Primary Examiner* — Jennifer Mehmood
*Assistant Examiner* — Andrew Bee
(74) *Attorney, Agent, or Firm* — Schmeiser, Olsen & Watts; Anna Linne

(57) ABSTRACT

A system, method and program product for communicating a privacy policy associated with a RFID tag. The method includes defining in an tag a first identifier for uniquely identifying the object and a second identifier for uniquely identifying a privacy policy that indicates a proper and intended use and level of protection to be afforded data/information transmitted by the identification tag coupled to the object, associating the second identifier with the first identifier, each of the first identifier and the second identifier being coupled to the identification tag, and responsive to detection of a communication signal received from a receptor, transmitting the first identifier and the second identifier, which includes an accept-reject provision for controlling dissemination and usage of the data/information transmitted by the identification tag, where based on a response received to the accept-reject provision, the data/information is either transmitted or not transmitted to the recipient.

18 Claims, 6 Drawing Sheets

U.S. PATENT DOCUMENTS

| | | | |
|---|---|---|---|
| 7,310,734 | B2 | 12/2007 | Boate et al. |
| 7,627,895 | B2 | 12/2009 | Gifford et al. |
| 7,671,746 | B2 | 3/2010 | Martinez de Velasco Cortina et al. |
| 7,788,500 | B2 | 8/2010 | Okamura et al. |
| 7,936,905 | B2 | 5/2011 | Takahashi et al. |
| 8,001,387 | B2 | 8/2011 | Lee et al. |
| 2002/0026582 | A1 | 2/2002 | Futamura et al. |
| 2002/0100803 | A1* | 8/2002 | Sehr .............................. 235/384 |
| 2002/0174010 | A1* | 11/2002 | Rice, III .......................... 705/14 |
| 2003/0088782 | A1 | 5/2003 | Forrest |
| 2003/0097383 | A1 | 5/2003 | Smirnov et al. |
| 2003/0115490 | A1 | 6/2003 | Russo et al. |
| 2003/0129965 | A1 | 7/2003 | Siegel |
| 2003/0189094 | A1 | 10/2003 | Trabitz |
| 2004/0020984 | A1 | 2/2004 | Clark |
| 2004/0123114 | A1 | 6/2004 | McGowan |
| 2004/0193893 | A1 | 9/2004 | Braithwaite et al. |
| 2005/0005136 | A1 | 1/2005 | Chen et al. |
| 2005/0038718 | A1 | 2/2005 | Barnes et al. |
| 2005/0055582 | A1 | 3/2005 | Bazakos et al. |
| 2005/0088320 | A1 | 4/2005 | Kovach |
| 2005/0180619 | A1 | 8/2005 | McClurg et al. |
| 2005/0229007 | A1 | 10/2005 | Bolle et al. |
| 2005/0240778 | A1 | 10/2005 | Saito |
| 2005/0283614 | A1* | 12/2005 | Hardt ............................ 713/182 |
| 2006/0078171 | A1 | 4/2006 | Govindaraju et al. |
| 2006/0090079 | A1 | 4/2006 | Oh et al. |
| 2006/0104484 | A1 | 5/2006 | Bolle et al. |
| 2006/0158751 | A1 | 7/2006 | McClurg et al. |
| 2006/0200683 | A1 | 9/2006 | King |
| 2006/0206723 | A1 | 9/2006 | Gil et al. |
| 2006/0267773 | A1 | 11/2006 | Roque |
| 2006/0289648 | A1* | 12/2006 | Shafer ........................... 235/451 |
| 2007/0040654 | A1 | 2/2007 | Lee et al. |
| 2007/0040693 | A1 | 2/2007 | Medve et al. |
| 2007/0044139 | A1 | 2/2007 | Tuyls et al. |
| 2007/0119924 | A1 | 5/2007 | Register, Jr. et al. |
| 2007/0136581 | A1 | 6/2007 | Hoghaug et al. |
| 2007/0164863 | A1* | 7/2007 | Himberger et al. ......... 340/572.1 |
| 2007/0180261 | A1 | 8/2007 | Akkermans et al. |
| 2007/0226512 | A1 | 9/2007 | Kevenaar et al. |
| 2007/0243932 | A1 | 10/2007 | Rothschild et al. |
| 2008/0024271 | A1 | 1/2008 | Oberman et al. |
| 2008/0037833 | A1 | 2/2008 | Takahashi et al. |
| 2008/0072284 | A1 | 3/2008 | Horvitz et al. |
| 2008/0130882 | A1 | 6/2008 | Hagglund et al. |
| 2008/0157927 | A1* | 7/2008 | Soppera et al. .............. 340/10.1 |
| 2008/0162943 | A1 | 7/2008 | Ali et al. |
| 2008/0169909 | A1* | 7/2008 | Park et al. .................... 340/10.4 |
| 2009/0022374 | A1 | 1/2009 | Boult |
| 2009/0027207 | A1 | 1/2009 | Shelton et al. |
| 2009/0271635 | A1 | 10/2009 | Liu et al. |
| 2010/0201498 | A1 | 8/2010 | Griffin |
| 2010/0205431 | A1 | 8/2010 | Griffin |
| 2010/0205452 | A1 | 8/2010 | Griffin |
| 2010/0205658 | A1 | 8/2010 | Griffin |
| 2010/0205660 | A1 | 8/2010 | Griffin |
| 2010/0332838 | A1 | 12/2010 | Zhu et al. |

FOREIGN PATENT DOCUMENTS

| | | |
|---|---|---|
| WO | 2005122467 | 12/2005 |

OTHER PUBLICATIONS

ITU-T Telecommunication Standardization Sector of ITU, X.667, Series X: Data Networks and Open System Communications—OSI networking and system aspects—Abstract Syntax Notation One (ASN.1), ISO/IEC 8824-1:2003 (E), 146 pages, Geneva, Switzerland 2005.

Griffin, P., U.S. Appl. No. 12/370,345, System, Method and Program Product for Associating a Biometric Reference Template With a Radio Frequency Identification Tag, filed Feb. 12, 2009.

Griffin, P., U.S. Appl. No. 12/370,350, System, Method and Program Product for Recording Creation of a Cancelable Biometric Reference Template in a Biometric Event Journal Record, filed Feb. 12, 2009.

Griffin, P., U.S. Appl. No. 12/370,359, System, Method and Program Product for Communicating a Privacy Policyassociated with a Biometric Reference Template, filed Feb. 12, 2009.

Griffin, P., U.S. Appl. No. 12/370,379, System, Method and Program Product for Generating a Cancelable Biometric Reference Template, filed Feb. 12, 2009.

Griffin, P., U.S. Appl. No. 12/370,334, System, Method and Program Product for Checking Revocation Status of a Biometric Reference Template, filed Feb. 12, 2009.

Griffin, P., ISO 19092: A Standard for Biometric Security Management, ISSA Journal, Jan. 2007, pp. 20-23.

Berners-Lee, T. et al., Uniform Resource Identifiers (URI): Generic Syntax, RFC 2396, http://ietfreport.isoc.org/rfc/rfc2396.txt, Aug. 1998, pp. 1-40.

Juels, A., et al., Soft Blocking: Flexible Blocker Tags on the Cheap, WPES' 04, Oct. 28, 2004, Washington, DC, USA, pp. 1-7.

Molnar, D., et al., Privacy for RFID Through Trusted Computing, WPES' 05, Nov. 7, 2005, Alexandria, Virginia, USA, pp. 31-34.

Ratha, et al.; Generating Cancelable Fingerprint Templates; IEEE Transactions on Pattern Analysis and Machine Intelligence; vol. 29, No. 4; Apr. 2007; pp. 561-572.

Office Action (Mail Date Nov. 9, 2011) for U.S. Appl. No. 12/370,359, filed Feb. 12, 2009; GAU 2434; Confirmation No. 5560.

Amendment filed Feb. 9, 2012 in response to Office Action (Mail Date Nov. 9, 2011) for U.S. Appl. No. 12/370,359, filed Feb. 12, 2009; GAU 2434; Confirmation No. 5560.

Office Action (Mail Date Nov. 1, 2011) for U.S. Appl. No. 12/370,345, filed Feb. 12, 2009; GAU 2612; Confirmation No. 4437.

Amendment filed Jan. 30, 2012 in response to Office Action (Mail Date Nov. 1, 2011) for U.S. Appl. No. 12/370,345, filed Feb. 12, 2009; GAU 2612; Confirmation No. 4437.

Office Action (Mail Date Jul. 13, 2011) for U.S. Appl. No. 12/370,334, filed Feb. 12, 2009; GAU 2434; Confirmation No. 5517.

Amendment filed Sep. 22, 2011 in response to Office Action (Mail Date Jul. 13, 2011) for U.S. Appl. No. 12/370,334, filed Feb. 12, 2009; GAU 2434; Confirmation No. 5517.

Final Office Action (Mail Date Oct. 12, 2011) for U.S. Appl. No. 12/370,334, filed Feb. 12, 2009; GAU 2434; Confirmation No. 5517.

Amendment and Request for Continued Examination filed Jan. 11, 2012 in response to Final Office Action (Mail Date Oct. 12, 2011) for U.S. Appl. No. 12/370,334, filed Feb. 12, 2009; GAU 2434; Confirmation No. 5517.

Office Action (Mail Date Sep. 27, 2011) for U.S. Appl. No. 12/370,379, filed Feb. 12, 2009; GAU 2434; Confirmation No. 5597.

Amendment filed Dec. 22, 2011 in response to Office Action (Mail Date Sep. 27, 2011) for U.S. Appl. No. 12/370,379, filed Feb. 12, 2009; GAU 2434; Confirmation 5597.

Office Action (Mail Date Mar. 6, 2012) for U.S. Appl. No. 12/370,334, filed Feb. 12, 2009; Confirmation No. 5517.

Final Office Action (Mail Date Mar. 9, 2012) for U.S. Appl. No. 12/370,345, filed Feb. 12, 2009; Confirmation No. 5537.

Office Action (Mail Date Mar. 13, 2012) for U.S. Appl. No. 12/370,350, filed Feb. 12, 2009; Confirmation No. 5548.

Amendment filed May 8, 2012 in response to Final Office Action (Mail Date Mar. 9, 2012) for U.S. Appl. No. 12/370,345, filed Feb. 12, 2009; Confirmation No. 5537.

Advisory Action (Mail Date May 14, 2012) for U.S. Appl. No. 12/370,345, filed Feb. 12, 2009; Confirmation No. 5537.

Final Office Action (Mail Date May 14, 2012) for U.S. Appl. No. 12/370,379, filed Feb. 12, 2009; Confirmation No. 5597.

Amendment filed May 24, 2012 in response to Advisory Action (Mail Date May 14, 2012) for U.S. Appl. No. 12/370,345, filed Feb. 12, 2009; Confirmation No. 5537.

Notice of Allowance (Mail Date May 30, 2012) for U.S. Appl. No. 12/370,345, filed Feb. 12, 2009; Confirmation No. 5537.

Amendment filed Jun. 4, 2012 in response to Office Action (Mail Date Mar. 6, 2012) for U.S. Appl. No. 12/370,334, filed Feb. 12, 2009; Confirmation No. 5517.

* cited by examiner

SYSTEM, METHOD AND PROGRAM PRODUCT FOR COMMUNICATING A PRIVACY POLICY ASSOCIATED WITH A RADIO FREQUENCY IDENTIFICATION TAG AND ASSOCIATED OBJECT

FIELD OF THE INVENTION

The present invention relates to computer systems and software, and more specifically to a technique for communicating a privacy policy associated with data and information stored on a Radio Frequency Identification (RFID) tag associated with a physical object.

BACKGROUND OF THE INVENTION

Data transmitted using a portable Radio Frequency Identification (RFID) tag may be used to uniquely identify an object, its location, or its characteristics, for instance, its color, shape, size, etc. An object containing an RFID tag can be used to identify or locate an individual associated with the object. Currently, there is no standardized means to indicate how information contained in an RFID tag should be protected during proper use. As such, there is a need for indicating a level of protection to be afforded the information contained in an RFID tag associated with a physical object in possession of an individual, to effectively specify the intended and proper use and handling of the information contained in the RFID tag without compromising the privacy of the individual.

SUMMARY OF THE INVENTION

The present invention resides in a system, method and program product for communicating a privacy policy associated with a Radio Frequency Identification (RFID) tag for a physical object, and any information content contained in the RFID tag, in accordance with an embodiment of the invention. The method for communicating a privacy policy associated with data and information stored in an identification tag includes defining in an identification tag one or more attributes referencing characteristics of a physical object, the one or more attributes includes a first identifier assigned to the physical object for uniquely identifying the physical object and a second identifier created for uniquely identifying a privacy policy that indicates to a recipient a proper and intended use of and a level of protection to be afforded data and information transmitted by the identification tag coupled to the physical object, associating the second identifier created with the first identifier assigned to the physical object, each of the first unique identifier and the second unique identifier being coupled to the identification tag, and responsive to detection of a communication signal received from a receptor, transmitting to the receptor the first identifier and the second identifier, the second identifier includes an accept-reject provision for the privacy policy for controlling dissemination and usage of the data and information transmitted by the identification tag, wherein based on a response received from a recipient to the accept-reject provision for the privacy policy, the data and information is either transmitted or not transmitted to the recipient. The method further includes signing the one or more attributes for cryptographically binding the one or more attributes to the identification tag. In an embodiment, the transmitting step further includes first ascertaining whether the recipient has accepted the accept-reject provision for the privacy policy referenced by the second identifier before transmitting to the recipient the data and information contained in the identification tag. In an embodiment, the transmitting step further includes responsive to a determination that the recipient has not accepted the accept-reject provision for the privacy policy referenced by the second identifier, not transmitting the data and information contained in the identification tag. In an embodiment, the defining step further includes assigning a first identifier to the physical object to be identified, and assigning a second identifier for the privacy policy for controlling dissemination and usage of the data and information. In an embodiment, the identification tag includes at least one of: an active tag and a passive tag. In an embodiment, the identification tag includes a chipless Radio Frequency Identification (RFID) tag, an active Radio Frequency Identification (RFID) tag, a bar code, a smart card, a chip card or an integrated circuit (ICC).

In another aspect, the invention provides a computer system for communicating a privacy policy associated with data and information stored on an identification tag, the computer system includes first program instructions to define in an identification tag one or more attributes referencing characteristics of a physical object, the one or more attributes includes a first identifier assigned to the physical object for uniquely identifying the physical object and a second identifier created for uniquely identifying a privacy policy that indicates to a recipient a level of protection to be afforded data and information transmitted by the identification tag coupled to the physical object, second program instructions to associate the second identifier created with the first identifier assigned to the physical object, each of the first unique identifier and the second unique identifier being coupled to the identification tag, third program instructions to transmit to a receptor, responsive to detection of a communication signal from the receptor, the first identifier and the second identifier, the second identifier includes an accept-reject provision for the privacy policy for controlling dissemination and usage of the data and information stored on the identification tag, wherein based on a response received from a recipient to the accept-reject provision for the privacy policy, the data and information is either transmitted or not transmitted to the recipient, a computer readable storage medium, the computer readable storage medium storing each of the first, second and third program instructions, and a central processing unit for executing each of the first, second and third program instructions. The computer system further includes fourth program instructions to sign the one or more attributes for cryptographically binding the one or more attributes to the identification tag, wherein the fourth program instructions are recorded on the computer readable storage medium. In an embodiment, the first program instructions include instructions to first ascertain whether the recipient has accepted the accept-reject provision for the privacy policy referenced by the second identifier before transmitting to the recipient the data and information contained in the identification tag. In an embodiment, the third program instructions include instructions to not transmit the data and information contained in the identification tag responsive to a determination that the recipient has not accepted the accept-reject provision for the privacy policy referenced by the second identifier. In an embodiment, the first program instructions further include instructions to assign a first identifier to the physical object to be identified and to assign a second identifier for the privacy policy for controlling dissemination and usage of the data and information. In an embodiment, the identification tag includes at least one of: an active tag and a passive tag. In an embodiment, the identification tag includes a chipless Radio Frequency Identification (RFID) tag, an active Radio Frequency Identification (RFID) tag, a bar code, a smart card, a chip card or an integrated circuit (ICC).

In yet another aspect, the invention provides a computer program product for communicating a privacy policy associated with data and information stored on an identification tag. The computer program product includes a computer readable storage medium, first program instructions to define in an identification tag one or more attributes referencing characteristics of a physical object, the one or more attributes includes a first identifier assigned to the physical object for uniquely identifying the physical object and a second identifier created for uniquely identifying a privacy policy that indicates to a recipient a level of protection to be afforded data and information transmitted by the identification tag coupled to the physical object, second program instructions to associate the second identifier created with the first identifier assigned to the physical object, each of the first unique identifier and the second unique identifier being coupled to the identification tag, and third program instructions to transmit to a receptor, responsive to detection of a communication signal from said receptor, the first identifier and the second identifier, the second identifier includes an accept-reject provision for the privacy policy for controlling dissemination and usage of the data and information stored on the identification tag, wherein based on a response received from a recipient to the accept-reject provision for the privacy policy, the data and information is either transmitted or not transmitted to the recipient, and wherein the first, second and third program instructions are recorded on the computer readable storage medium. The computer program product further includes fourth program instructions to sign the one or more attributes for cryptographically binding the one or more attributes to the identification tag, wherein the fourth program instructions are recorded on the computer readable storage medium. In an embodiment, the first program instructions further include instructions to assign a first identifier to the physical object to be identified and to assign a second identifier for the privacy policy for controlling dissemination and usage of the data and information, and wherein the first program instructions include instructions to first ascertain whether the recipient has accepted the accept-reject provision for the privacy policy referenced by the second identifier before transmitting to the recipient the data and information contained in the identification tag. In an embodiment, the third program instructions include instructions to not transmit the data and information contained in the identification tag responsive to a determination that the recipient has not accepted the accept-reject provision for the privacy policy referenced by the second identifier. In an embodiment, the identification tag includes at least one of: an active tag and a passive tag. In an embodiment, the identification tag includes a chipless Radio Frequency Identification (RFID) tag, an active Radio Frequency Identification (RFID) tag, a bar code, a smart card, a chip card or an integrated circuit (ICC).

Further, in yet another aspect, the invention provides a process for deploying computing infrastructure includes integrating computer-readable code into a computing system, wherein the code in combination with the computing system is capable of performing a process for communicating a privacy policy associated with data and information. The process includes defining in an identification tag one or more attributes referencing characteristics of a physical object, the one or more attributes includes a first identifier assigned to the physical object for uniquely identifying the physical object and a second identifier created for uniquely identifying a privacy policy that indicates to a recipient a level of protection to be afforded data and information transmitted by the identification tag coupled to the physical object, associating the second identifier created with the first identifier assigned to the physical object, each of the first unique identifier and the second unique identifier being coupled to the identification tag, responsive to detection of a communication signal from a receptor, transmitting to the receptor the first identifier and the second identifier, the second identifier includes an accept-reject provision for the privacy policy for controlling dissemination and usage of the data and information stored on the identification tag, wherein based on a response received from a recipient to the accept-reject provision for the privacy policy, the data and information is either transmitted or not transmitted to the recipient, and signing the one or more attributes for cryptographically binding the second identifier to said first identifier. In an embodiment, the transmitting step further includes first ascertaining whether the recipient has accepted the accept-reject provision for the privacy policy referenced by the second identifier before transmitting to the recipient the data and information contained in the identification tag. In an embodiment, the transmitting step further includes responsive to a determination that the recipient has not accepted the accept-reject provision for the privacy policy referenced by the second identifier, not transmitting the data and information contained in the identification tag. In an embodiment, the identification tag includes at least one of: an active tag and a passive tag. In an embodiment, the identification tag includes a chipless Radio Frequency Identification (RFID) tag, an active Radio Frequency Identification (RFID) tag, a bar code, a smart card, a chip card or an integrated circuit (ICC).

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents. Reference will now be made in detail to the preferred embodiments of the invention.

Figure 1:
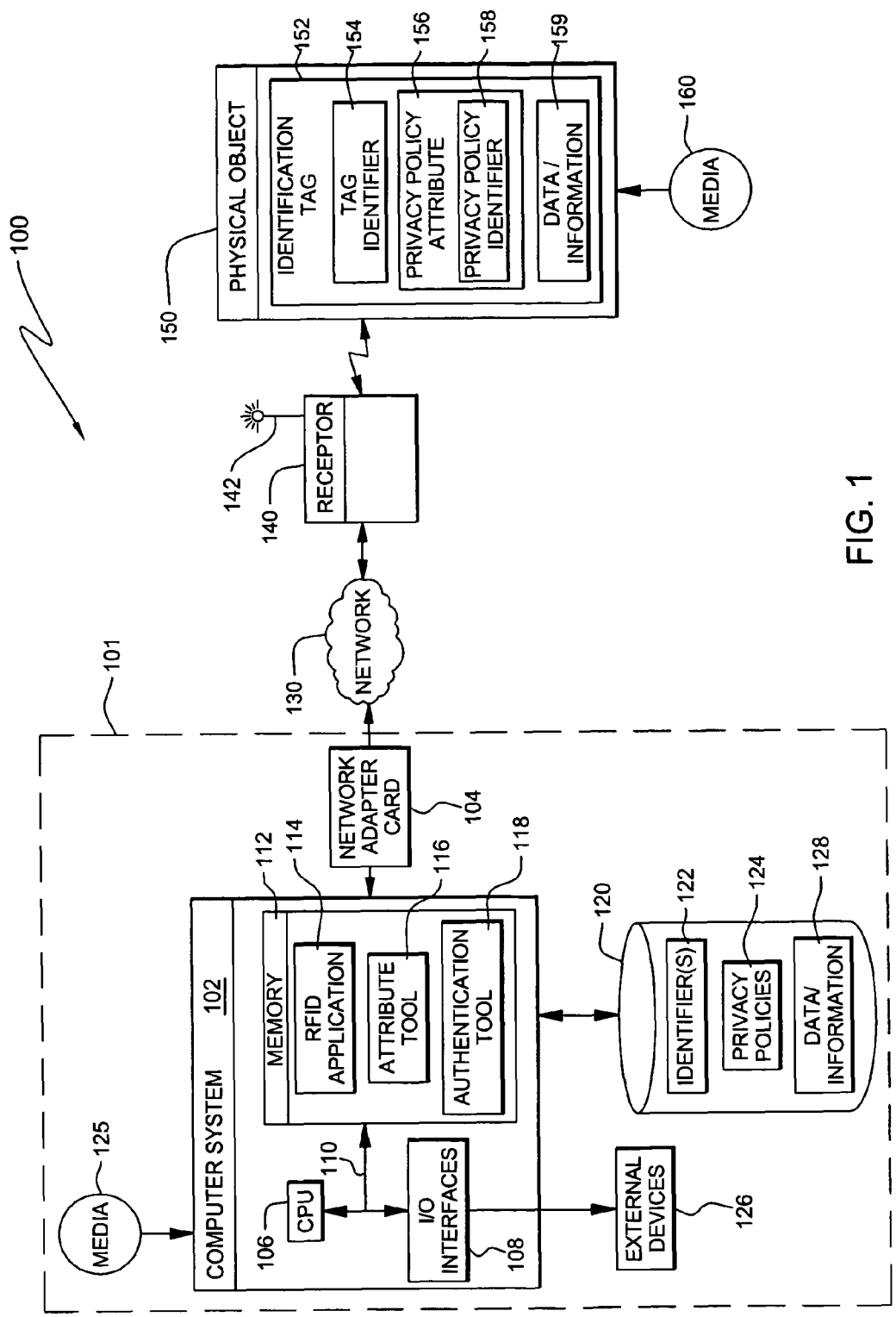
FIG. 1 depicts an embodiment of a computer infrastructure for communicating a privacy policy associated with a Radio Frequency Identification (RFID) tag for a physical object for specifying the intended and proper handling and use of the information contained in the RFID tag, in accordance with an embodiment of the present invention.

In one embodiment, the invention provides a computer infrastructure 100 for communicating a privacy policy associated with an identification tag or device, such as, a Radio Frequency Identification (RFID) tag (also referred to herein as "RFID tag" or "RFID" or simply as "tag") attached or embedded in a physical object, such that, the privacy policy specifies the intended and proper use and handling of the information contained in the RFID tag for the object, in accordance with an embodiment of the invention. In an embodiment, the RFID tag or device 152 attached to or embedded in a physical object 150 is an active RFID tag that comprises a microchip combined with an antenna in a compact unit that is equipped with a battery that provides a source of power for the RFID tag's circuitry and antenna. In another embodiment, the RFID tag 152 attached to or embedded in a physical object 150 is a chipless RFID tag (also known as RF fibers) that does not include any integrated circuit technology and instead comprises fibers that reflect a portion of the receptor or reader's radio-frequency signal back. Although the invention is described in terms of a Radio Frequency Identification (RFID) tag, it will be understood that an identification tag may include a bar code, a smart card, a chip card or an integrated circuit (ICC) having integrated circuits that can process data. Reference is now made to FIG. 1, reference numeral 100, which schematically illustrates an embodiment of a computer infrastructure that has deployed thereon a Radio Frequency Identification (RFID) application 114 for communicating a privacy policy associated with a Radio Frequency Identification (RFID) tag embedded in or attached to a physical object for indicating the level of protection required for the information contained in the RFID tag and its proper and intended use. As shown in FIG. 1, the infrastructure 100 includes a computer system 102 that is connected to a network 130. In an embodiment, as depicted in FIG. 1, computer system or server 102 is intended to represent any type of computer system that is maintained in a secure environment, that is, for which access control is enforced (as represented by the dotted lines indicated by reference numeral 101). In an embodiment, the computer system 102 is an information processing server that includes a RFID application 114 for programming RFID tags embedded in or attached to objects. Further, the computer system or server 102 is configured to work with RFID receptors that interrogate or query RFID tags associated with the system 100. In an embodiment, the computer system 102 includes an attribute tool or program 116 for creating one or more attributes that are to be associated with the RFID tag, as discussed herein below. Further, in an embodiment, the computer system 102 includes an authentication tool 118 for signing attributes, as discussed further herein below. As shown in FIG. 1, the RFID system 100 includes a receptor or reader or scanner 140 for receiving a tag identifier and other information from an identification tag 152 embedded in or affixed to a physical object 150. In an embodiment, the receptor 140 comprises a RFID receptor that has an antenna 142 that receives radio waves for reading or radiates radio waves for interrogating a RFID tag 152. In an embodiment, the RFID tag 152 also comprises an antenna (not shown in any of the drawings). The RFID tag's antenna picks up the signals radiated from the RFID receptor or scanner or reader device 140 and the RFID tag 152 responds to the signal by sending data and/or information 159 stored within the RFID tag 152. Further, the receptor 140 transmits, via network 130, the data and/or information 159 read from the RFID tag 152 to the computer system 102 for storage. In an embodiment, the data and/or information received is stored within a database 120 associated with computer system or server 102, as shown by reference numeral 128 in database 120. In an embodiment, the RFID tag 152 embedded in or attached to the object 150 further includes a unique tag identifier or object identifier 154 that is radiated or broadcasted by the RFID tag when the tag is scanned, and where the unique tag identifier 154 uniquely identifies the object 150 associated with the identification tag or RFID tag 152. The RFID receptor 140 reads data and/or information related to the unique tag identifier within the identification tag 152. Further, the RFID tag 152 for the physical object 150 includes a privacy policy attribute 156 that contains a privacy policy identifier 158 that uniquely identifies a privacy policy that is to be associated with the identification tag 152 for indicating a level of protection required for the data and/or information contained in the RFID tag 152 and its proper and intended use by a recipient, as explained further herein below with respect to FIGS. 2-4. Referring to FIG. 1, the computer system or server 102 is shown to include a CPU (Central CPU) 106, a memory 112, a bus 110, and input/output (I/O) interfaces 108. Further, the server 102 is shown in communication with external I/O devices/resources 126 and database 120. In general, CPU 106 executes computer program code stored in memory 112, such as the RFID application 114, the attribute tool 116 for creating or defining one or more attributes to be included in the RFID tag 152, and an authentication tool 118 for signing attributes that are created for an identification tag 152. In an embodiment, the one or more identifier(s) 122 and privacy policies 124 that are associated with a RFID tag 152 are stored in database 120. Further, in an embodiment, any data and/or information 128 transmitted by the RFID tag 152 are stored in database 120. In general, CPU 106 executes computer program code stored in memory 112, such as the RFID application 114 and/or the attribute tool 116 for creating identification tags 152 that have associated with it a privacy policy attribute 156 that contains a privacy policy identifier 154. While executing the RFID application or program 114 on the computer system or server 102, the CPU 106 can read and/or write data, to/from memory 112, database 120, and/or I/O interfaces 108, such as, the data and/or information 128 stored in database 120. Alternatively, the RFID application 114 may store the data and/or information in memory 112. Bus 110 provides a communication link between each of the components in computer system 102, such that information can be communicated within the infrastructure 100. External devices 126 can comprise any devices (e.g., keyboard, pointing device, display, etc.) that enable a user to interact with computer system 102 and/or any devices (e.g., network card, modem, etc.) that enable the system 102 to communicate with one or more other computing devices, such as, the receptor 140 and/or the identification tag 152. The attribute tool 116 and/or the authentication tool 118 can be loaded into memory 112 of the computer system 102 from a computer-readable storage medium or media (reference numeral 125), such as, a magnetic tape or disk, optical media, DVD, memory stick, semiconductor memory, etc. or downloaded from the server via a network adapter card (reference numerals 104) installed on the computer system or server 102. Similarly, the privacy policy attributes created by the computer system 102 for a RFID or identification tag 152 can be loaded onto the tag 152 using a storage medium or media (reference numeral 160). It should be understood, however, that although not shown, other hardware and software components (e.g., additional computer systems, routers, firewalls, etc.) could be included in infrastructure 100.

Figure 2:
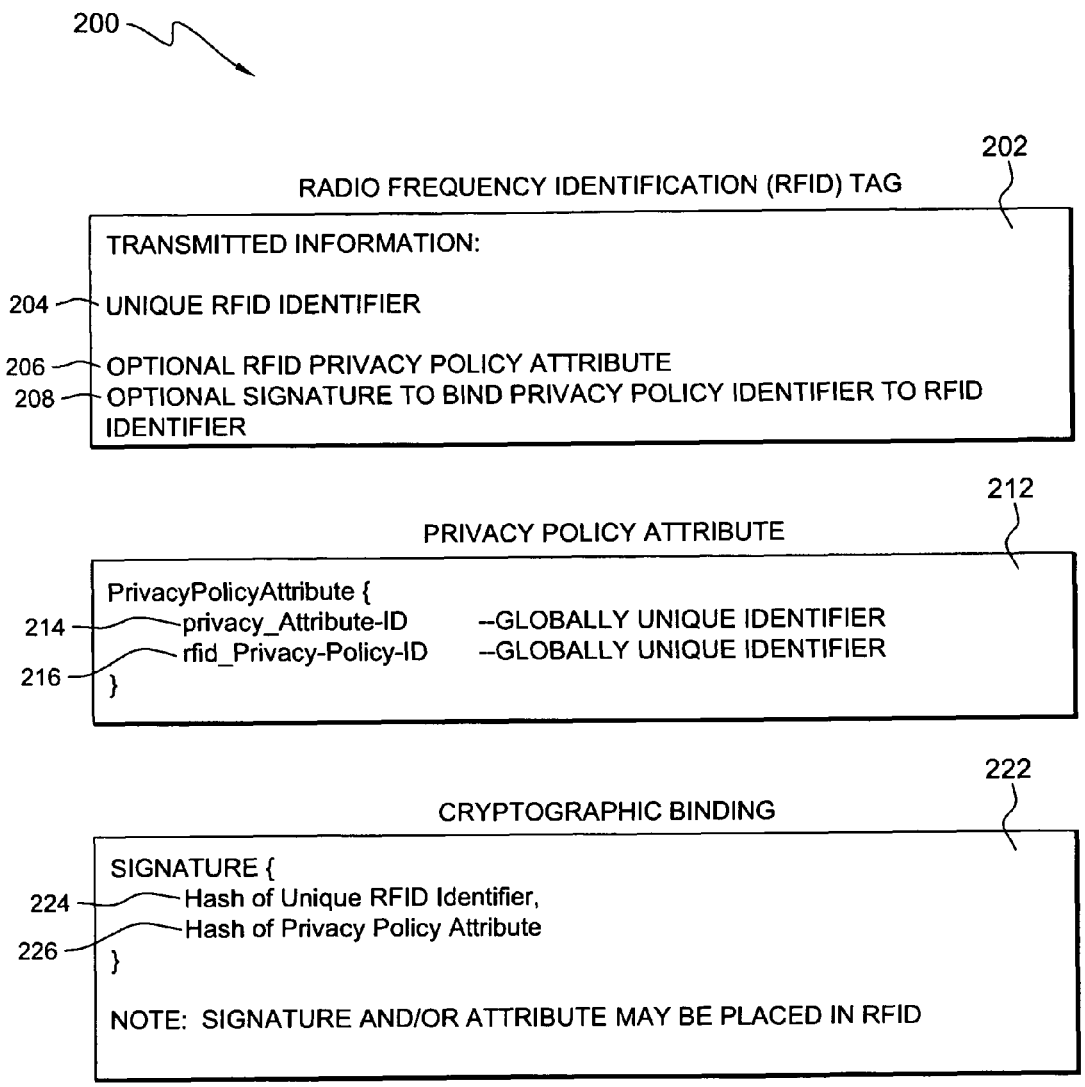
FIG. 2 is a block diagram depicting an illustration of a Radio Frequency Identification (RFID) tag containing a privacy policy attribute identifying a privacy policy associated with the RFID tag for specifying the intended and proper handling and use of the information contained in the RFID tag, in accordance with an embodiment of the present invention.

Reference is now made to FIG. 2, reference numeral 200, which depicts an illustration of a Radio Frequency Identification (RFID) tag embedded in or attached to a physical object that further has associated with it a privacy policy attribute for identifying a privacy policy associated with the RFID tag, where the privacy policy specifies the intended and proper use and handling of the data and/or information contained in the RFID tag, in accordance with an embodiment of the present invention. In an embodiment, the RFID tag 202 comprises a unique RFID identifier (also referred to herein as "tag identifier" or "object identifier" 204 that comprises a value that is radiated as waves by the RFID device when the device is scanned. In an embodiment, the RFID identifier 204 uniquely identifies an associated object that the Radio Frequency Identification (RFID) tag is embedded in or attached to. Further, in an embodiment, the RFID tag 202 has associated with it a privacy policy attribute 212, which comprises a generic information object that contains two unique information object identifier (OID) values. The first identifier identifies the attribute as a privacy policy attribute, as opposed to some other type of attribute and the second identifier identifies the type of content carried in the information object, namely, a RFID privacy policy. In an embodiment, the privacy_Attribute-ID 214 is a globally unique identifier that identifies the type of attribute as a privacy policy attribute and the RFID_Privacy-Policy-ID 216 is a globally unique identifier that identifies the privacy policy attribute content, in particular, that the content is a RFID privacy policy. In an embodiment, the RFID_Privacy-Policy-ID 216 identifies an information object that can comprise a document, a web page, or perhaps a law. The privacy policy identifier 216 can be created in the form of an information object identifier (OID) as defined in ISO/IEC 8824-1 and ISO/IEC 9834-8, a universally unique identifier (UUID) as defined in ISO/IEC 9834-8, a uniform resource identifier (URI) as defined in RFC 2396, a cryptographic hash of an RFID privacy policy, a digital signature over the privacy policy, or some other means of uniquely naming the privacy policy. When OIDs, UUIDs, or URIs are used, these indicators can be included in the RFID privacy policy attribute information. Further, as shown in FIG. 2, the unique RFID identifier 204 for the tag 202 is cryptographically bound to the privacy policy attribute 212 using a digital signature or a cryptographic binding 222. In particular, a hash or hash value (reference numeral 224) is first computed over the unique RFID identifier (reference numeral 204) and a hash value (reference numeral 226) is computed over the privacy policy attribute (reference numeral 212). Then, any of a number of algorithms can be used to sign the respective hash values 224 and 226. For instance, if a RSA algorithm is used to sign the hash, a private key is used to encrypt the hash to form the digital signature, which is then decrypted by a relying party using their associated public key. However, the unique RFID identifier 204 can be cryptographically bound to the privacy policy attribute 212 using other methods, such as a Message Authentication Code (MAC) or encryption. Accordingly, the RFID privacy policy associated with the RFID tag (and by proxy the associated object) indicates the level of protection required for the RFID data and/or information transmitted and its proper and intended use. In an embodiment, the privacy policy attribute 212 may be placed in the RFID tag 202 itself (shown as reference numeral 206), such that, the privacy policy attribute is transmitted with the RFID identifier or tag identifier information itself. Further, in an embodiment, the privacy policy attribute may be signed and the signature (reference numeral 208) is included in the RFID tag 202. Furthermore, in an embodiment, the RFID tag 202 containing a privacy policy attribute need not be signed with a signature (reference numeral 222) when used in a context in which a trust relationship has been established. However, when trust by a third party is needed, the privacy policy attribute 212 is signed with a signature 222 (using an authentication tool 118 as shown in FIG. 1) and the signature 222 is included in the RFID tag as a component of the signed privacy policy attribute, which notifies a relying party that there is a privacy policy associated with the RFID tag. When the signature is validated and trust in the signed information is established, the relying party is assured that the privacy policy is for the given RFID tag, since the signature 222 covers the hash of the unique RFID identifier (reference numeral 224) and the hash of the privacy policy attribute (reference numeral 226) and the relying party can compare this signed hash to ensure that the hash is identical to a hash the relying party computes over the unique RFID identifier value embedded in or attached to the objected containing the privacy policy attribute.

Figure 3:
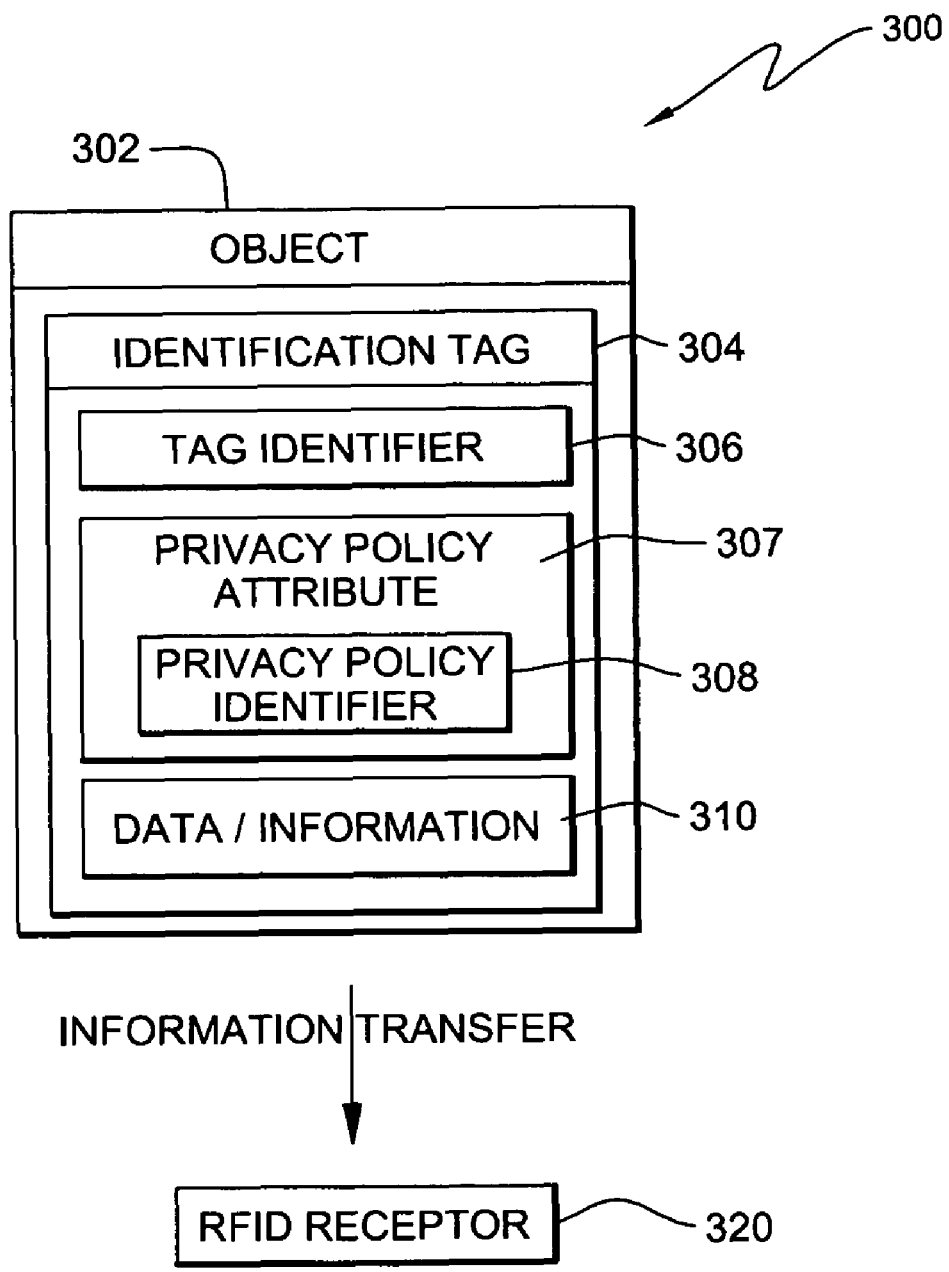
FIG. 3 is a block diagram depicting one embodiment of an illustration of a transfer of information contained in a Radio Frequency Identification (RFID) tag embedded in or attached to a physical object to an RFID receptor, in accordance with an embodiment of the present invention.
Figure 4:
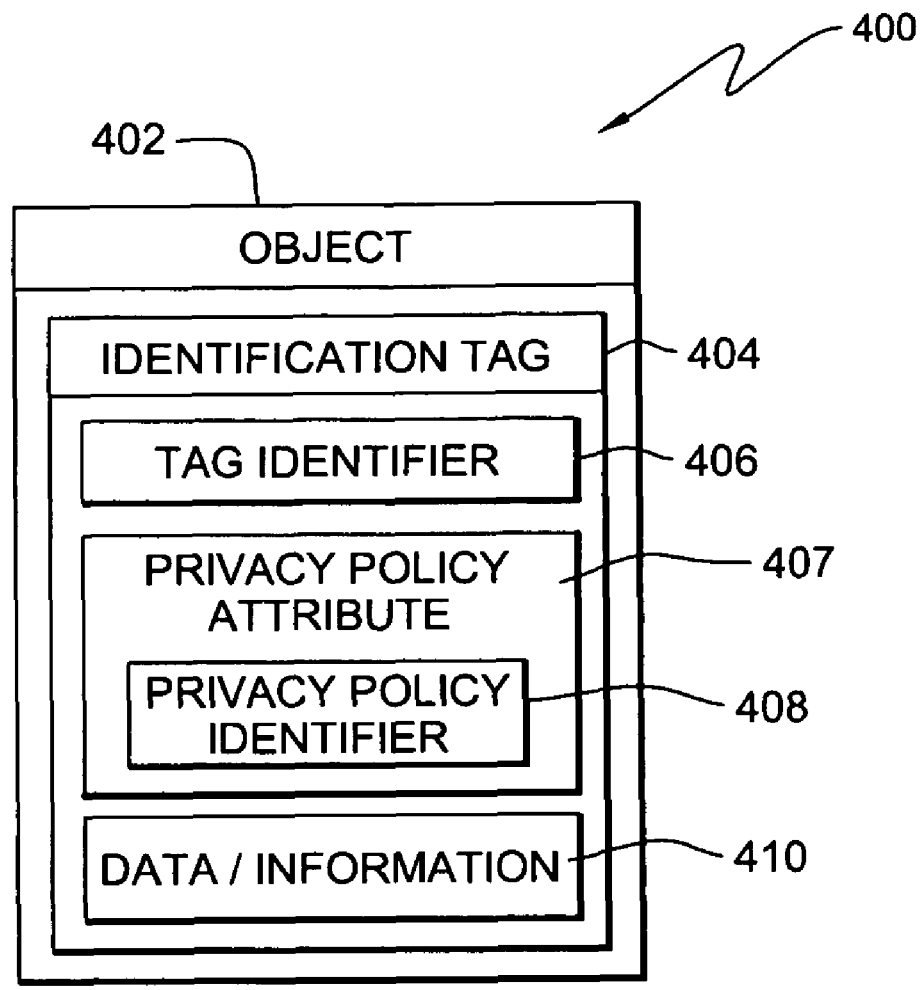
FIG. 4 is a block diagram depicting one embodiment of an illustration of a transfer of information contained in a Radio Frequency Identification (RFID) tag embedded in or attached to a physical object to an RFID receptor, in accordance with an embodiment of the present invention.

Reference is now made to FIGS. 3 and 4, which depict various embodiments of a RFID system, illustrating a transfer of information contained in a Radio Frequency Identification (RFID) tag embedded in or attached to a physical object to an RFID receptor, in accordance with an embodiment of the present invention. Turning to FIG. 3, reference numeral 300 depicts the transfer of information from an identification tag or RFID tag 304 embedded in or attached to a physical object 302 to a RFID receptor 320. In an embodiment, the RFID tag 304 embedded in or attached to the object 302 further includes a unique tag identifier or object identifier 306 that uniquely identifies the object 302 associated with the RFID tag. The RFID receptor 320 reads data and/or information 310 related to the unique tag identifier within the identification tag 304. Further, the RFID tag 304 for the physical object 302 includes a privacy policy attribute 307 that includes a privacy policy identifier 308 for uniquely identifying a privacy policy associated with the identification tag 304 for indicating a level of protection required for the data and/or information 310 contained in the RFID tag 304 and its proper and intended use by a recipient. The RFID tag 304 transmits the privacy policy indicator to an RFID receptor 320. Based on the identified privacy policy requirements, the RFID receptor 320 acts on the information transferred by the RFID tag 304. The RFID receptor 320 may discard the information 310 after use or refuse to further process the information, or when the privacy policy allows, encrypt the information 310 for secure storage or transfer of the information 310 to a computer system (as shown in FIG. 1).

Turning to FIG. 4, reference numeral 400 depicts a RFID system for the transfer of information 410 from an identification tag or RFID tag 404 embedded in or attached to a physical object 402 to a RFID receptor 420, where a protocol is used to transmit an accept-reject provision for the privacy policy and where the information 410 is only transmitted from the RFID tag to the recipient, if the privacy policy provision is accepted. In an embodiment, the RFID tag 404 embedded in or attached to the object 402 further includes a unique tag identifier or object identifier 406 that uniquely identifies the object 402 associated with the RFID tag. The RFID receptor 420 reads data and/or information 410 related to the unique tag identifier within the identification tag 404. Further, the RFID tag 404 for the object 402 includes a privacy policy attribute 407 that includes a privacy policy identifier 408 that uniquely identifies a privacy policy associated with the identification tag 404 for indicating a level of protection required for the data and/or information 410 contained in the RFID tag 404 and its proper and intended use by a recipient. The RFID tag 404 transmits the privacy policy indicator to an RFID receptor 420. Based on the requirements of the identified privacy policy, the RFID receptor 420 may accept or reject the privacy policy, as explained further herein below. Only if the privacy policy provision is accepted will the information 410 be transferred by the RFID tag 404. In an embodiment, the RFID tag 404 within system 400 may require a digital signature on an acknowledgement to indicate acceptance of the privacy policy provision and the RFID system may archive this agreement or transfer this information to an event log for auditing purposes. For instance, the RFID tag 404 may send encrypted content with an indicator of the previously agreed key needed to decrypt the content or the RFID or identification tag 404 may establish an encryption key by other means, such as, by using a key agreement scheme, or using a key transport mechanism. As such, a RFID or identification tag 404 with only read and write capabilities contains information 410 that may be revealed only to recipients who identify themselves and agree to adhere to the privacy policy for the information 410 on the RFID tag 404. In an embodiment, the data and information 410 may be protected by encryption, and may be digitally signed. An entity reads a tag identifier 406, a privacy policy attribute containing the privacy policy identifier 408, and some encrypted data 410. In an embodiment, the privacy policy attribute contains a privacy policy identifier, and a Uniform Resource Identifier (URI) in the form of a Uniform Resource Locator (URL). To recover the plaintext from the encrypted data 410, the entity communicates with a server using the URL and a query string containing the tag identifier and the privacy policy identifier. The general syntax of the query string is:

?$tag_1$=$policy_1$&$tag_2$=$policy_2$&$tag_3$=$policy_3$

The information in this attribute uses the value of the tag component of an RFID tag, which uniquely identifies both an RFID tag and the key needed to decrypt the encrypted RFID content, and a privacy policy identifier value registered by a cryptographic service provider that uniquely identifies the privacy policy for the encrypted content on the RFID tag. These identification values serve as the two parameters "<tag>" and "<policy>" of a URI query string. In an embodiment, a fully formed URL and query string can suffice as the privacy policy attribute stored on the RFID tag. With the tag identifier and privacy policy identifier parameters, and the interface provided by the GET method of HTTP, a URI query string can be constructed that returns the key needed to decrypt the content on a particular RFID. In an embodiment, the complete query string is formed by concatenating a query URI and the tag identifier and privacy policy identifier values. The server receiving the query string uses the tag identifier to determine which key is needed to decrypt the encrypted content stored on a given RFID tag. Further, the server uses the privacy policy identifier to determine the protocol it needs to follow in releasing the decryption key to the entity, so that the requirements of the privacy policy can be met. The server authenticates itself to the entity and asks the entity to authenticate itself to the server, and for the entity to accept the privacy policy for the encrypted data on the RFID. This mutual authentication is performed using public-private key pairs associated with digital certificates, which allows the server to keep information on when and to whom it has provided a particular key that can recover the plaintext from the encrypted content on the RFID, and to receive from the entity a public key which it can use to encrypt a symmetric key that only the entity in possession of the associated private key can recover. If entity authentication to the server fails, or the entity fails to agree to accept the privacy policy, the key is not provided by the server and the entity cannot recover the encrypted content on the RFID. If the entity authenticates to the server and accepts the privacy policy, the server encrypts the RFID content decryption key using the public key of the entity, so that only the private key of the entity can recover the decryption key. The server sends the protected decryption key to the entity. The entity decrypts the received content using the private key component of its public-private key pair and recovers the RFID content decryption key. The entity then decrypts the encrypted RFID content to recover the plaintext protected on the RFID tag.

Figure 5:
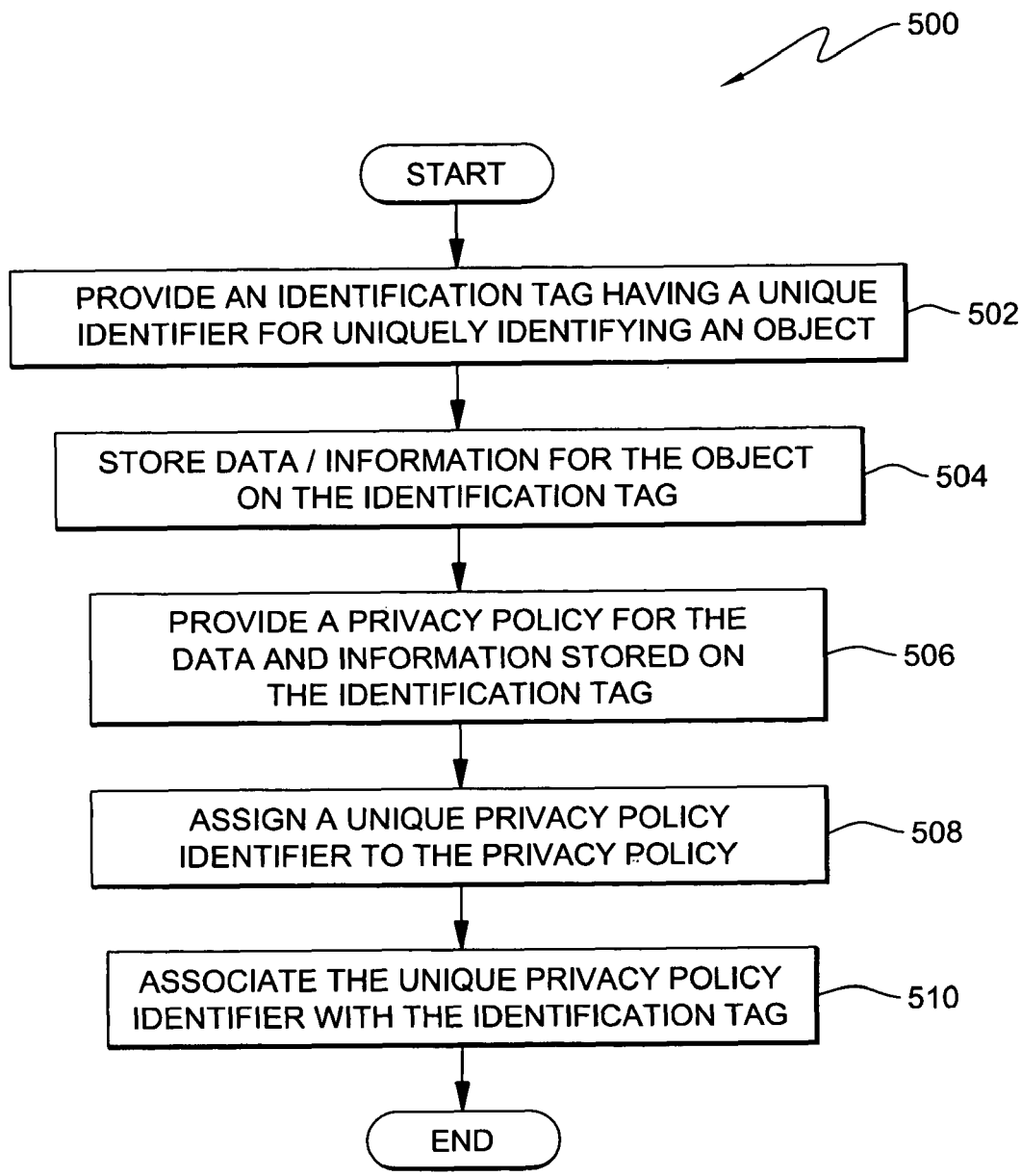
FIG. 5 depicts a flowchart outlining the steps for providing a Radio Frequency Identification (RFID) tag for a physical object that also contains a privacy policy that is associated with the RFID tag for specifying the intended and proper use of the information contained in the RFID tag, in accordance with an embodiment of the present invention.

In another embodiment, the invention provides a method for communicating a privacy policy associated with an identification tag or device embedded in or associated with a physical object for specifying the intended and proper use and handling of the data and/or information contained in the RFID tag. Reference is now made to FIG. 5, reference numeral 500, which depicts a flowchart outlining the method steps for providing a Radio Frequency Identification (RFID) tag for a physical object that includes a privacy policy information for specifying the intended and proper use and handling of the data and/or information contained in the RFID tag, in accordance with an embodiment of the present invention. The method begins with providing, in step 502, an identification tag or RFID tag that has a unique identifier for uniquely identifying a physical object. In step 504, data and information for the object are stored on the RFID tag. Further, in step 506, a privacy policy is provided or selected for the data and information stored on the identification tag. A globally unique privacy policy identifier is assigned to the privacy policy in step 508. In step 510, the unique privacy policy identifier is associated with the RFID tag embedded in or attached to a physical object. In an embodiment, a unique privacy policy identifier can be used to indicate a particular RFID privacy policy and to serve as a name for the privacy policy. As mentioned herein above, the privacy policy identifier could be created in the form of an information object identifier (OID) as defined in ISO/IEC 8824-1 and ISO/IEC 9834-8, a universally unique identifier (UUID) as defined in ISO/IEC 9834-8, a uniform resource identifier (URI) as defined in RFC 2396, a cryptographic hash of an RFID privacy policy, a digital signature over the privacy policy, or some other means of uniquely naming the privacy policy. When OIDs, UUIDs, or URIs are used for creating privacy policy identifiers, these indicators could be included in the RFID privacy policy information. The RFID privacy policy associated with the RFID tag (and associated object) indicates the level of protection required for the RFID data and/or information transmitted and its proper and intended use. As such, the RFID privacy policy indicator within the identification or RFID tag allows RFID users to determine the appropriate level of protection needed when using the RFID information and to avoid improper use and handling of the information. Further, the RFID privacy policy identifier along with the RFID tag can be used to manage the risk of unauthorized storage, retention and/or aggregation of the RFID information, and may be used to safeguard against inappropriate use.

Figure 6:
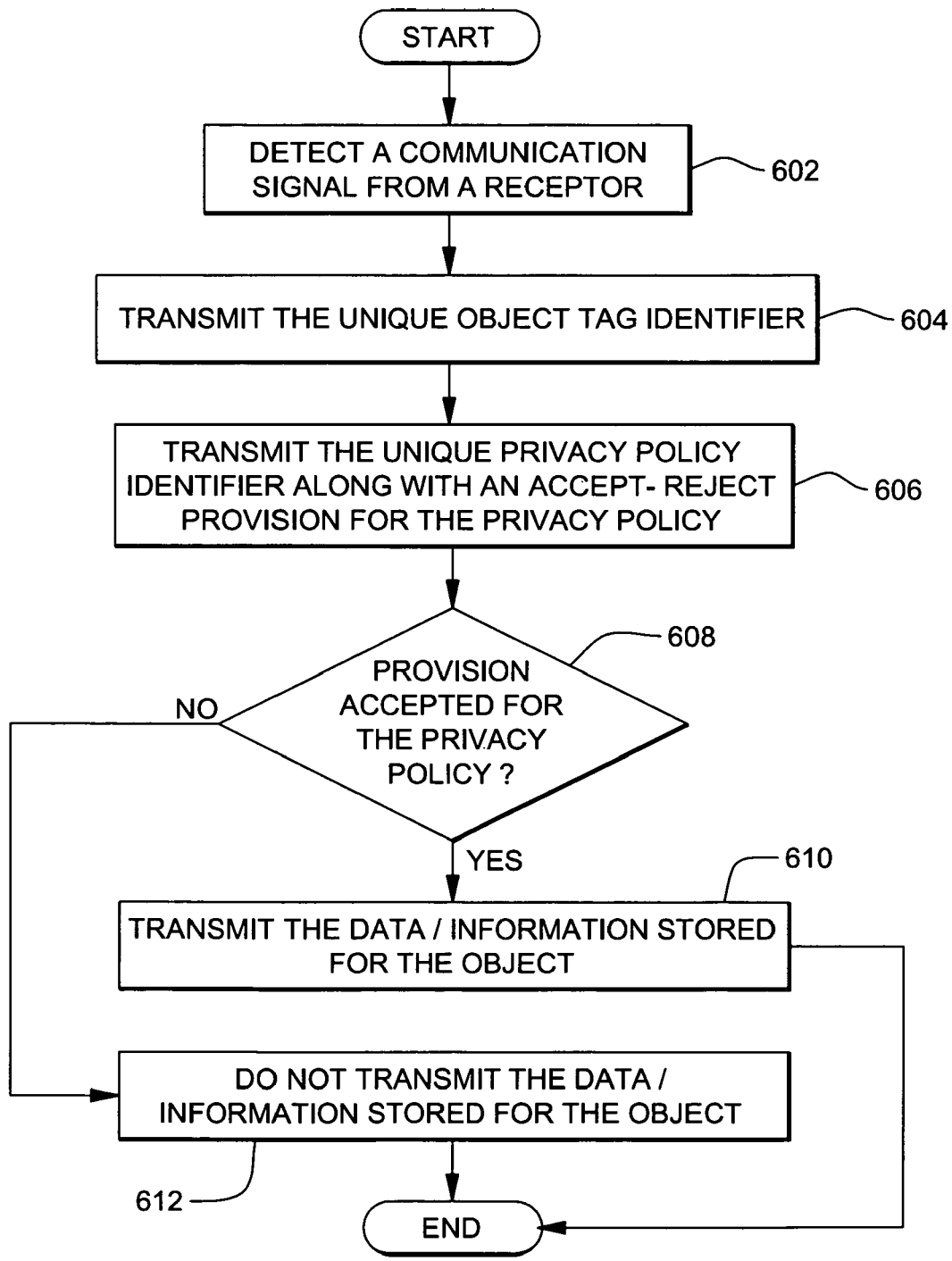
FIG. 6 depicts a flowchart outlining the steps performed by a RFID system for communicating information contained in a Radio Frequency Identification (RFID) tag for a physical object having a privacy policy associated with the RFID tag for specifying the intended and proper handling and use of the information contained in the RFID tag, in accordance with an embodiment of the present invention.

Reference is now made to FIG. 6, reference numeral 600, which depicts a flowchart outlining the steps performed by a RFID system for communicating information contained in a Radio Frequency Identification (RFID) tag embedded in or attached to a physical object, where the RFID tag further communicates a privacy policy associated with the RFID tag for specifying the intended and proper use and handling of the data and/or information contained in the RFID tag, in accordance with an embodiment of the present invention. In step 602, a communication signal is detected with a RFID receptor. The RFID tag transmits the unique object identifier or tag identifier in step 604. Further, in step 606, the RFID tag transmits the unique privacy policy identifier along with an accept-reject provision for the privacy policy. A determination is made by the RFID tag in step 608 as to whether or not the privacy policy provision has been accepted. If the accept-reject provision is accepted, then the RFID tag transmits in step 610 the data and information stored for the object on the RFID tag to the receptor, ending the process. However, if a determination is made in step 608 that the accept-reject provision is not accepted, then the RFID tag does not transmit the data and information stored for the object on the RFID tag to the receptor, ending the process.

Accordingly, the invention provides a system, method and a program product for communicating a privacy policy associated with data and information stored on a Radio Frequency Identification (RFID) tag for a physical object, in accordance with an embodiment of the invention. The invention facilitates effective RFID information security management, since it helps organizations that are exposed to risk of non-compliance with privacy laws and regulations manage the privacy of the information contained in objects containing RFIDs. As such, the invention may be used in an identity management, identification, authentication, or authorization system that incorporates the use of RFIDs. For instance, retail stores selling equipment could use RFID tags containing privacy policy attribute for identifying a privacy policy required for the information transmitted by the RFID tags.

The foregoing descriptions of specific embodiments of the present invention have been presented for the purpose of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for communicating a privacy policy associated with data and information stored on an identification tag, said method comprising:
   at least one processor of a computer system including in an identification tag one or more attributes referencing characteristics of a physical object, said one or more attributes including a first identifier assigned to said physical object for uniquely identifying said physical object and a second identifier created for uniquely identifying a privacy policy that indicates to a recipient a proper and intended use of and a level of protection to be afforded data and information transmitted by said identification tag included in said physical object;
   said at least one processor associating said second identifier with said first identifier assigned to said physical object, each of said first unique identifier and said second unique identifier being included in said identification tag; and
   said at least one processor transmitting to a recipient, responsive to detection of a communication signal received from a receptor, said first identifier and said second identifier, said second identifier including an accept-reject provision for said privacy policy for controlling dissemination and usage of said data and information transmitted by said identification tag, wherein based on a response received from said recipient to said accept-reject provision for said privacy policy, said data and information is either transmitted or not transmitted to said recipient.

2. The method of claim 1, wherein said method further comprises:
   said at least one processor signing said one or more attributes.

3. The method of claim 2, wherein said method further comprises:
   said at least one processor ascertaining whether said recipient has accepted said accept-reject provision for said privacy policy referenced by said second identifier.

4. The method of claim 3, wherein said transmitting further comprises:
   responsive to a determination that said recipient has not accepted said accept-reject provision for said privacy policy referenced by said second identifier, not transmitting said data and information contained in said identification tag.

5. The method of claim 4, wherein said including further comprises:
   assigning the first identifier to said physical object to be identified; and
   assigning the second identifier for said privacy policy for controlling dissemination and usage of said data and information.

6. The method of claim 5, wherein said identification tag comprises a chipless Radio Frequency Identification (RFID) tag, an active Radio Frequency Identification (RFID) tag, a passive Radio Frequency Identification (RFID) tag, a bar code, a smart card, a chip card or an integrated circuit (ICC).

7. A computer program product, comprising at least one computer-readable physically tangible storage device having computer-readable program code stored therein, said program code containing instructions configured to be executed by at least one processor of a computer system to implement a method for communicating a privacy policy associated with data and information stored on an identification tag, said method comprising:
- said at least one processor of a computer system including in an identification tag one or more attributes referencing characteristics of a physical object, said one or more attributes including a first identifier assigned to said physical object for uniquely identifying said physical object and a second identifier created for uniquely identifying a privacy policy that indicates to a recipient a proper and intended use of and a level of protection to be afforded data and information transmitted by said identification tag included in said physical object;
- said at least one processor associating said second identifier with said first identifier assigned to said physical object, each of said first unique identifier and said second unique identifier being included in said identification tag; and
- said at least one processor transmitting to a recipient, responsive to detection of a communication signal received from a receptor, said first identifier and said second identifier, said second identifier including an accept-reject provision for said privacy policy for controlling dissemination and usage of said data and information transmitted by said identification tag, wherein based on a response received from said recipient to said accept-reject provision for said privacy policy, said data and information is either transmitted or not transmitted to said recipient.

8. The computer program product of claim 7, wherein said computer program product further comprises said at least one processor signing said one or more attributes.

9. The computer program product of claim 8, wherein said computer program product further comprises said at least one processor ascertaining whether said recipient has accepted said accept-reject provision for said privacy policy referenced by said second identifier.

10. The computer program product of claim 9, wherein said transmitting further comprises:
- responsive to a determination that said recipient has not accepted said accept-reject provision for said privacy policy referenced by said second identifier, not transmitting said data and information contained in said identification tag.

11. The computer program product of claim 10, wherein said including further comprises:
- assigning the first identifier to said physical object to be identified; and
- assigning the second identifier for said privacy policy for controlling dissemination and usage of said data and information.

12. The computer program product of claim 11, wherein said identification tag wherein said identification tag comprises a chipless Radio Frequency Identification (RFID) tag, an active Radio Frequency Identification (RFID) tag, a passive Radio Frequency Identification (RFID) tag, a bar code, a smart card, a chip card or an integrated circuit (ICC).

13. A computer system comprising at least one processor, at least one memory coupled to said at least one processor, and at least one computer-readable storage device coupled to said at least one processor, said at least one computer-readable storage device containing program code configured to be executed by said at least one processor via said memory to implement a method for communicating a privacy policy associated with data and information stored on an identification tag, said method comprising:
- said at least one processor including in an identification tag one or more attributes referencing characteristics of a physical object, said one or more attributes including a first identifier assigned to said physical object for uniquely identifying said physical object and a second identifier created for uniquely identifying a privacy policy that indicates to a recipient a proper and intended use of and a level of protection to be afforded data and information transmitted by said identification tag included in said physical object;
- said at least one processor associating said second identifier with said first identifier assigned to said physical object, each of said first unique identifier and said second unique identifier being included in said identification tag; and
- said at least one processor transmitting to a recipient, responsive to detection of a communication signal received from a receptor, said first identifier and said second identifier, said second identifier including an accept-reject provision for said privacy policy for controlling dissemination and usage of said data and information transmitted by said identification tag, wherein based on a response received from said recipient to said accept-reject provision for said privacy policy, said data and information is either transmitted or not transmitted to said recipient.

14. The computer system of claim 13, wherein said computer system further comprises said at least one processor signing said one or more attributes.

15. The computer system of claim 14, wherein said computer system further comprises said at least one processor ascertaining whether said recipient has accepted said accept-reject provision for said privacy policy referenced by said second identifier.

16. The computer system of claim 15, wherein said transmitting further comprises responsive to a determination that said recipient has not accepted said accept-reject provision for said privacy policy referenced by said second identifier, not transmitting said data and information contained in said identification tag.

17. The computer system of claim 16, wherein said including further comprises:
- assigning the first identifier to said physical object to be identified; and
- assigning the second identifier for said privacy policy for controlling dissemination and usage of said data and information.

18. The computer system of claim 17, wherein said identification tag comprises a chipless Radio Frequency Identification (RFID) tag, an active Radio Frequency Identification (RFID) tag, a passive Radio Frequency Identification (RFID) tag, a bar code, a smart card, a chip card or an integrated circuit (ICC).

* * * * *